(12) United States Patent
Hashimoto

(10) Patent No.: US 6,567,086 B1
(45) Date of Patent: May 20, 2003

(54) IMMERSIVE VIDEO SYSTEM USING MULTIPLE VIDEO STREAMS

(75) Inventor: Roy T. Hashimoto, Redwood City, CA (US)

(73) Assignee: Enroute, Inc., Palo Alto, CA (US)

( * ) Notice: Subject to any disclaimer, the term of this patent is extended or adjusted under 35 U.S.C. 154(b) by 160 days.

(21) Appl. No.: 09/625,380

(22) Filed: Jul. 25, 2000

(51) Int. Cl.[7] ................................................ G06T 17/00

(52) U.S. Cl. ........................................ 345/427; 345/473

(58) Field of Search ................................. 345/418, 427, 345/424, 473, 474

(56) References Cited

U.S. PATENT DOCUMENTS 6,360,000 B1 * 3/2002 Collier ........................ 382/100

* cited by examiner

*Primary Examiner*—Cliff N. Vo
(74) *Attorney, Agent, or Firm*—Edward S. Mao; Bever, Hoffman & Harms (57) ABSTRACT

An immersive video system for displays a view window of an environment using multiple video streams. The immersive video system includes a video source containing multiple overlapping video streams. An immersive video decoder selects an active video stream based on the location of the view window. A video decoder decodes the active video stream for the immersive video decoder. The immersive video decoder then selects the appropriate parts of the video stream to display in the view window.

32 Claims, 10 Drawing Sheets

IMMERSIVE VIDEO SYSTEM USING MULTIPLE VIDEO STREAMS

CROSS-REFERENCE TO RELATED APPLICATIONS

This application relates to co-pending application Ser. No. 09/505.442, entitled "ENVIRONMENT DISPLAY USING TEXTURE PROJECTIONS WITH POLYGONAL CURVED SURFACES", by Hashimoto, et. al., filed Feb. 16, 2000, owned by the assignee of this application and incorporated herein by reference.

FIELD OF THE INVENTION

The present invention relates environment display systems. More specifically, the present invention relates to using multiple video streams to increase the resolution of an immersive video systems.

BACKGROUND OF THE INVENTION

Figure 1:
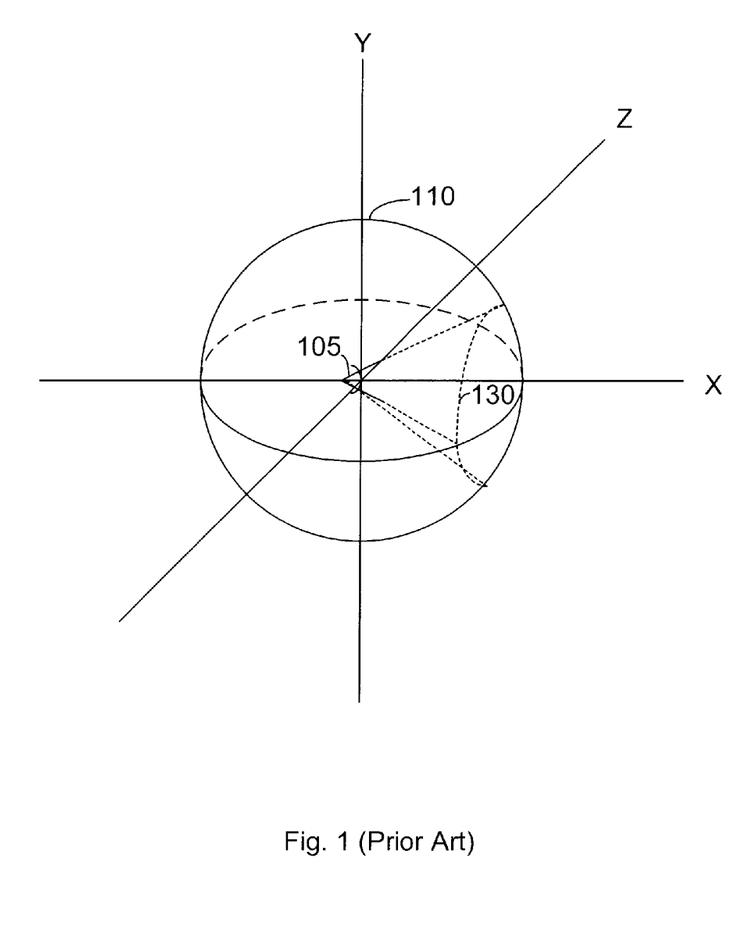
FIG. 1 is a three-dimensional representation of a user and an environment.

As the processing power of microprocessors and the quality of graphics systems have increased, environment mapping systems have become feasible on consumer electronic systems. Environment mapping systems use computer graphics to display the surroundings or environment of a theoretical viewer. Ideally, a user of the environment mapping system can view the environment at any horizontal or vertical angle. FIG. 1 illustrates the construct used in conventional environment mapping systems. A viewer 105 (represented by an angle with a curve across the angle) is centered at the origin of a three dimensional space having X, Y, and Z coordinates. The environment of viewer 105 (i.e., what the viewer can see) is ideally represented by a sphere 110, which surrounds viewer 105. Generally, for ease of calculation, sphere 110 is defined with a radius of 1 and is centered at the origin of the three dimensional space. More specifically, the environment of viewer 105 is captured and then re-projected onto the inner surface of sphere 110. Viewer 105 has a view window 130 which defines the amount of sphere 110 viewer 105 can see at any given moment. View window 130 is typically displayed on a display unit for the user of the environment mapping system.

Conventional environment mapping systems include an environment capture system and an environment display system. The environment capture system creates an environment map which contains the necessary data to recreate the environment of viewer 105. The environment display system displays portions of the environment in view window 130 based on the field of view of the user of the environment display system. An environment display system is described in detail by Hashimoto et al., in co-pending U.S. patent application Ser. No. 09/505.442, entitled "ENVIRONMENT DISPLAY USING TEXTURE PROJECTIONS WITH POLYGONAL CURVED SURFACES." Typically, the environment capture system includes a camera system to capture the entire environment of viewer 105.

Figure 2:
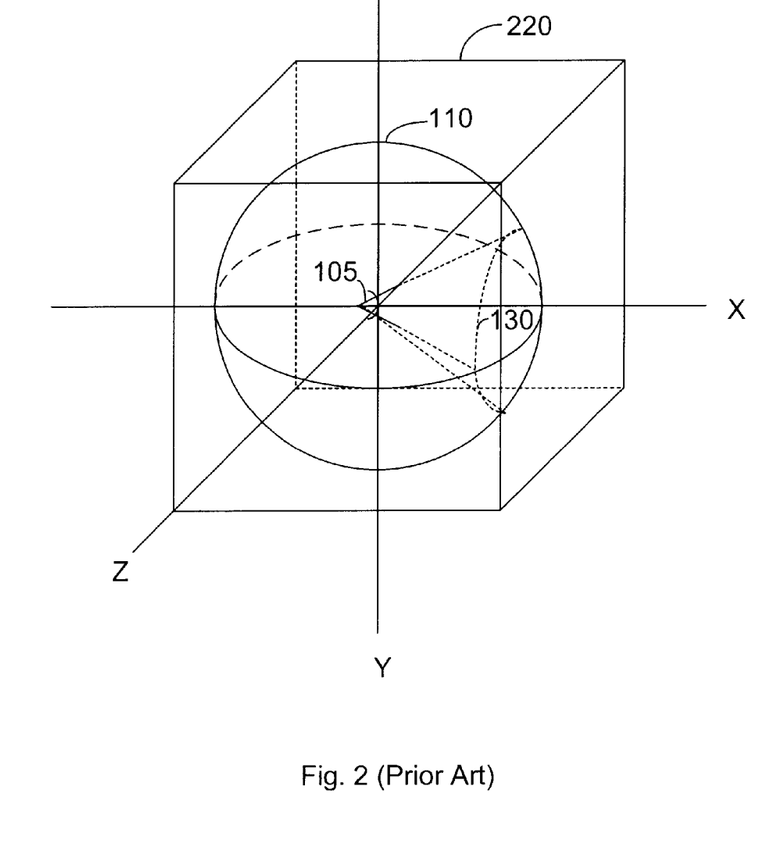
FIG. 2 is a three-dimensional representation of an environment surrounded by a cube.

Computer graphic systems are generally not designed to process and display spherical surfaces. Thus, as illustrated in FIG. 2, texture mapping techniques are used to create a texture projection of the inner surface of sphere 110 onto polygonal surfaces of a regular solid (i.e., a platonic solid) having sides that are tangent to sphere 110. As illustrated in FIG. 2, a common texture projection is to use a cube 220 surrounding sphere 110. Specifically, the environment image on the inner surface of sphere 110 serves as a texture map which is texture mapped onto the inner surfaces of cube 220. A cube is typically used because most graphics systems are optimized to use rectangular displays and a cube provides six rectangular faces. Other regular solids (i.e., tetrahedrons, octahedrons, dodecahedrons, and icosahedrons) have non-rectangular faces. The faces of the cube can be concatenated together to form the environment map. During viewing, the portions of the environment map that correspond to view window 130 (FIG. 1 and FIG. 2) are displayed for viewer 105. Because, the environment map is linear, texture coordinates can be interpolated across the face of each cube based on the vertex coordinates of the faces during display.

Figure 3:
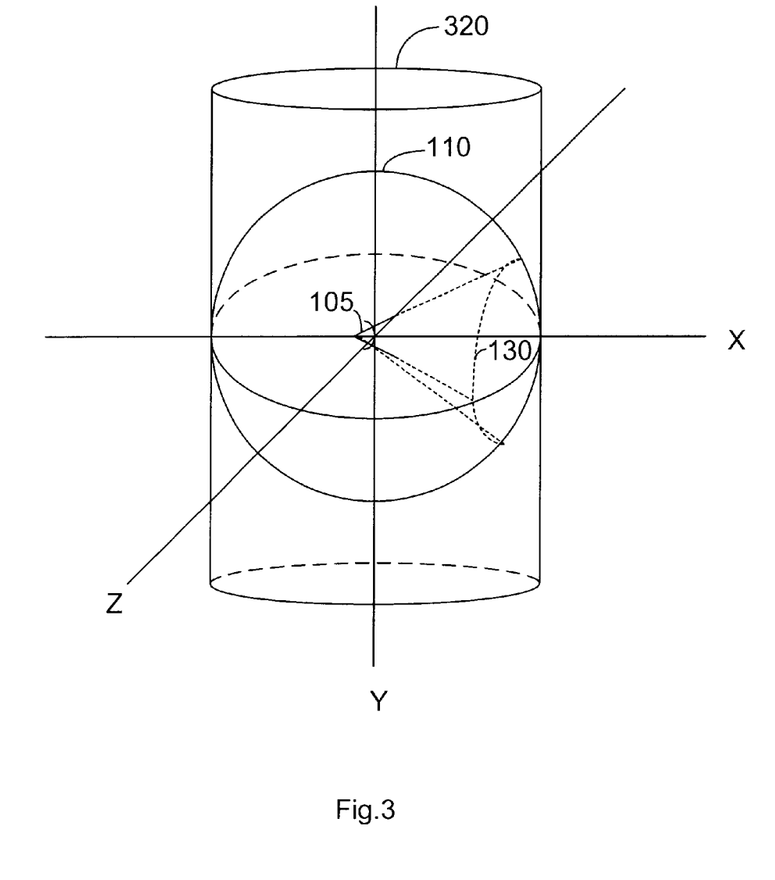
FIG. 3 is a three-dimensional representation of an environment surrounded by a cylinder.
Figure 4:
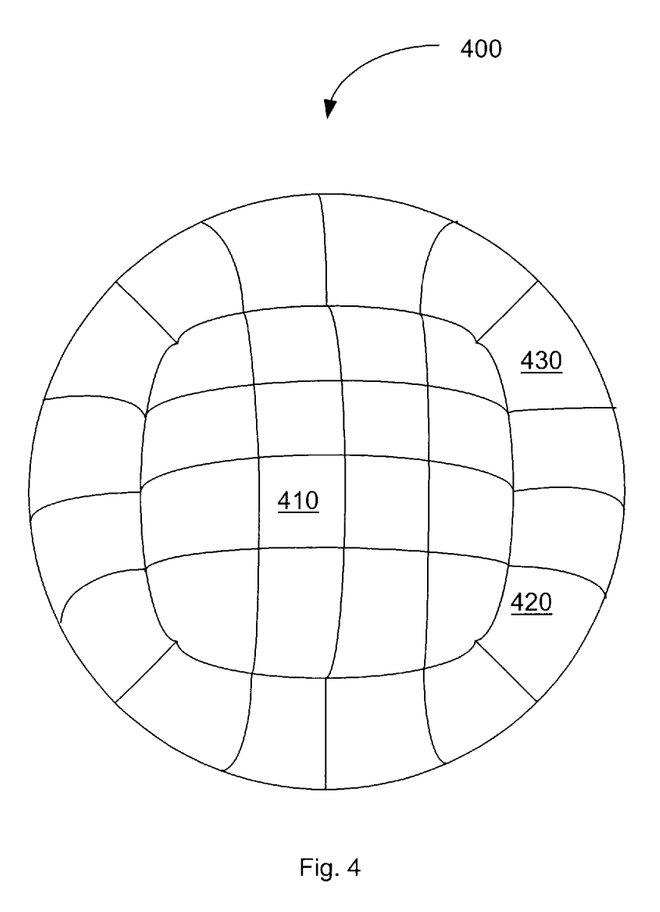
FIG. 4 is a three-dimensional diagram of texture projection using polygonal curved surfaces.

Other texture projections can also be used. For example, cylindrical mapping, as illustrated in FIG. 3, can be used if view window 130 is limited to a visible range around the equator. Specifically, in FIG. 3, a texture projection in the shape of a cylinder 320 surrounds sphere 110. Portions of the environment image on the inner surface of sphere 110 serves as a texture map which is texture mapped onto the inner surfaces of cylinder 320. Often, cylinder 320 is approximated using a plurality of rectangular sides to simplify the texture mapping. FIG. 4 illustrates a texture projection ideally suited for environment mapping. Specifically, FIG. 4 shows a texture projection comprising a plurality of polygonal curved surfaces, such as polygonal curved surfaces 410, 420, and 430. The polygonal curved surfaces form a sphere 400 having the same radius as sphere 110 (FIG. 1). The environment image on the inner surface of sphere 110 serves as a texture map for the polygonal curved surfaces. Creation and use of polygonal curved surfaces in environment projection is described in co-pending U.S. patent application Ser. No. 09/505.442, entitled "ENVIRONMENT DISPLAY USING TEXTURE PROJECTIONS WITH POLYGONAL CURVED SURFACES."

An extension to environment mapping is generating and displaying immersive videos. Immersive video involves creating multiple environment maps, ideally at a rate of 30 frames a second, and displaying appropriate sections of the multiple environment maps for viewer 105, also ideally at a rate of 30 frames a second. Immersive videos are used to provide a dynamic environment rather than a single static environment as provided by a single environment map. Alternatively, immersive video techniques allow the location of viewer 105 to be moved. For example, an immersive video can be made to capture a flight in the Grand Canyon. The user of an immersive video display system would be able to take the flight and look out at the Grand Canyon at any angle.

Difficulties with immersive video are typically caused by the vast amount of data required to create a high resolution environment map and the large number of environment maps required for immersive video. Thus, most environment mapping systems use very large environment maps, i.e. 1024×1024 or 2048×2048. Conventional high-quality immersive video systems would also require such high resolution environment maps to create high-quality immersive videos. However, conventional video equipment are designed and built to fixed standards regarding image resolution, compression, and other features, which may not provide enough bandwidth for high-quality immersive videos. For example, standard NTSC video streams provides an equivalent resolution of 640 by 480 pixels. While this resolution is adequate for conventional videos, it is inadequate for high-quality immersive videos, which must include the entire environment of a viewer not just the portions being viewed. Hence, there is a need for a method and system of displaying immersive videos while satisfying the constraints of conventional video equipment.

SUMMARY OF THE INVENTION

Accordingly, the present invention provides an immersive video system which utilizes multiple video streams to display high resolution immersive videos using conventional video equipment. In one embodiment of the present invention, an immersive video system for displaying a view window includes a video source, a video decoder coupled to the video source, and an immersive video decoder coupled to the video decoder. The video source is configured to produce a plurality of video streams. The video decoder is configured to decode an active video stream selected by the immersive video decoder from the plurality of video streams. The video streams contain environment data for the environment. Each video stream overlaps at least one other video stream so that the active video stream can be switched between the plurality of video streams without discontinuities. In some embodiments of the present invention, each video stream overlaps at least two other video streams. Generally the amount of overlap is approximately the size of the view window. Additionally, some embodiments of the present invention include view control interfaces to position the view window.

The video source in many embodiments of the present invention includes a video reader and a video storage medium. For example, a specific embodiment of the present invention uses DVD as the video storage medium. However, other embodiments may use other video storage mediums, such as a hard disk or solid state memories. The video storage medium contains multiple video streams each having a viewable range from a reference point. Generally, the viewable range of the video streams overlap. For example, in one embodiment of the present invention, the video storage medium stores four video streams. The viewable range of the first video stream overlaps the viewable range of the second and fourth video stream. Similarly, the viewable range of the third video stream also overlaps the viewable range of the second and fourth video streams.

The present invention will be more fully understood in view of the following description and drawings.

DETAILED DESCRIPTION

As explained above, conventional video standards are inadequate for high resolution immersive video applications. While, immersive video systems can create high resolution immersive videos using proprietary formats, the cost of immersive videos can be greatly lowered if conventional video equipment and standards can be used. In accordance with the present invention, multiple video streams are used in combination by an immersive video system. The video streams can conform to conventional video standards and thus use conventional video equipment to greatly reduce the cost of the immersive video system.

Figure 5:
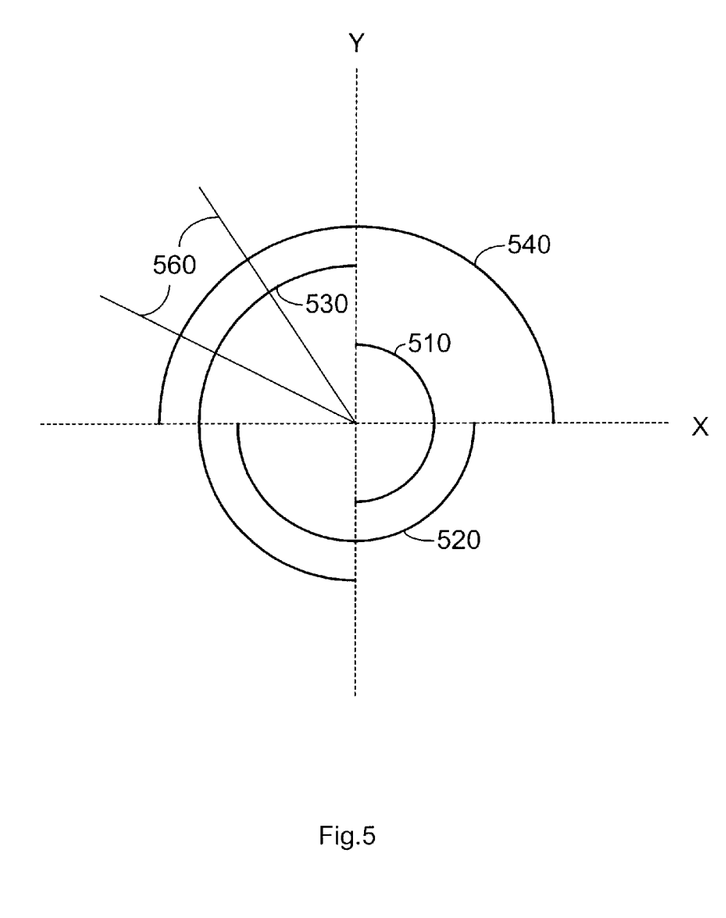
FIG. 5 is a representation of the field of views of multiple video streams in accordance with one embodiment of the present invention.

FIG. 5 illustrates the principles of the present invention. Specifically, FIG. 5 shows an overhead view of viewer 105, who has a view window 130. FIG. 5 also shows video streams 510, 520, 530, and 540. For clarity, FIG. 5 only illustrates the XY plane. Video streams 510, 520, 530 and 540 are drawn with a circular representation as would be used with the cylindrical projection of FIG. 3 or the spherical projection of FIG. 4. However, one skilled in the art can adapt the principles of the present invention for other texture projection.

Each video stream in FIG. 5 contains information for 180 degrees of view and overlaps an adjacent video stream by 90 degrees. For clarity, the positive X-axis is defined as 0 degrees and positive angles are measured in the counter clockwise direction from 0 to 360 degrees. Modular angle values (MOD 360 degrees) may also be used. For example, 270 degrees is equivalent to negative 90 degrees. Furthermore, angular ranges are provided in the counter-clockwise direction. For example the range 0 to 180 degrees include 0 to 180 degrees, while the range 180 to 0 degrees includes angles 180 to 360 degrees. In FIG. 5, video stream 510 provides a view angle from 270 degrees to 90 degrees. Similarly, video stream 520, 530, and 540 provide a views from 180 degrees to 360 degrees (i.e. 0 degrees), 90 degrees to 270 degrees, and 0 degrees to 180 degrees, respectively. For clarity, various video streams are shown with different radiuses. However, in actual implementation the video streams use the same radius and have the origin as the point of reference for viewing angle ranges.

FIGS. 6(a)–6(f) illustrates a method of using multiple video streams to provide a high resolution immersive video in accordance to one embodiment of the present invention. Specifically, FIGS. 6(a)–6(f) illustrates video streams 510, 520, 530, and 540 and a view window 620. For clarity, the embodiment of FIGS. 6(a)–6(f) is explained assuming video streams 510, 520, 530, and 540 are using a cylindrical projection and view window 620 is confined to the cylindrical projection. Thus, the z-coordinates of view window 520 can be ignored.

Figure 6A:
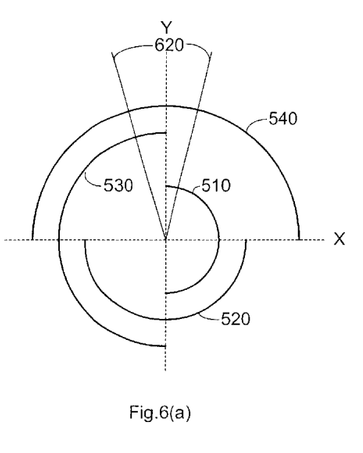
FIGS. 6(a)–6(e) a method of using multiple video streams to create a seamless immersive video in accordance with one embodiment of the present invention.
Figure 6B:
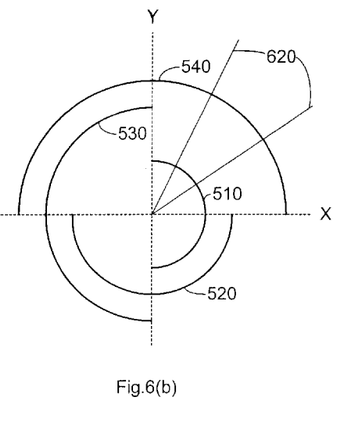

To reduce processing overhead, a single video stream (hereinafter called the active video stream) should encompass view window 620 to avoid the necessity of decoding multiple video streams and combining multiple video streams. The selection of the active video stream is dictated by the placement and motion of view window 620. For example as illustrated in FIG. 6(a), when view window 620 is positioned at 90 degrees, (as used herein, the position of view window 620 is based on the center of the view window) only video stream 540 encompasses all of view window 620. Thus, video stream 540 is the active video stream. As shown in FIG. 6(b), when view window 520 moves clockwise from 90 degrees, both video stream 540 and video stream 510 can be the active video stream. Various method to determine an appropriate time to switch the active video stream is discussed below.

Figure 6C:
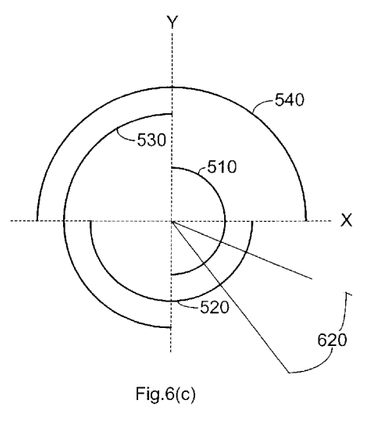
Figure 6D:
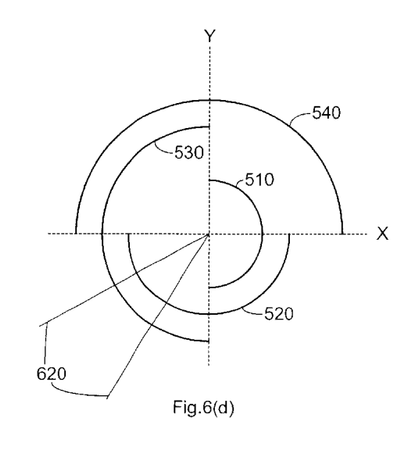
Figure 6E:
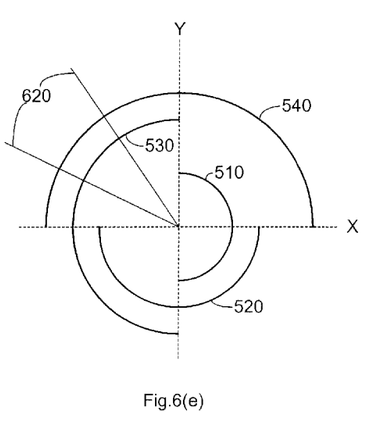

As view window 620 continues to move in a counter clockwise direction, the active video stream is switched from video stream 510 to video stream 520 after video stream 520 encompasses all of view window 620 as illustrated in FIG. 6(c). Then, as illustrated in FIG. 6(d), the active video stream is switched from video stream 520 to video stream 530 after view window 620 is completely encompassed by video stream 530. Then, as illustrated in FIG. 6(e), the active video stream is switched from video stream 530 to video stream 540 after view window 620 is completely encompassed by video stream 540.

In actual use, view window 620 may move clockwise and counter clockwise. If video window 620 moves in the clock wise direction the active video stream would switch from video stream 510 to video stream 540, from video stream 540 to video stream 530, from video stream 530 to video stream 520, or from video stream 520 to video stream 510. Furthermore, video window 620 may change directions at any moment. Thus, for example, the active video stream may bounce back and forth between two adjacent video streams such as video stream 520 and video stream 510.

Although video streams 510, 520, 530 and 540 have a 180 degree of view and overlap by 90 degrees, other embodiments of the present invention may use video streams having different field of view and a different amount of overlap. In general, the amount of overlap between adjacent video streams must be greater than or equal to the viewing angle of view window 620. Furthermore, the video streams must provide complete coverage over the possible position range of view window 620. Thus for example if view window 620 can roam 360 degrees then the video streams must cover all 360 degrees. Consequently, the view angle of N video streams should be greater than or equal to the total roaming angle of view window 620 plus N times the viewing angle of view window 620. For clarity, the examples given herein assume that view window 620 can roam 360 degrees. Thus, each video stream should have a viewing angle greater than or equal to 360/N plus the viewing angle of view window 620, where N is the total number of video streams. Thus for example if view window 620 is 90 degrees and four video streams are being used, the viewing angle of each video stream should be greater than or equal to 180 degrees (i.e. 360/4+90).

In actual implementation, the viewing angle of each video stream should include a buffer angle. Thus the viewing angle of a video stream should be equal to 360/N plus the viewing angle of view window 620 plus the buffer angle. The buffer angle would depend on the maximum speed view window 620 can move as well as other various factors. For example, if MPEG compression is used on the video streams, the video stream would include I frame, B frames, and P frames. Only I frames includes all the information in the frame, B frames and P frames are derived from other frames. Thus, the switching of the active video stream may be limited to occur only during I frames. Thus, the buffer angle should take into account how often I frames are used in the video streams.

Figure 7:
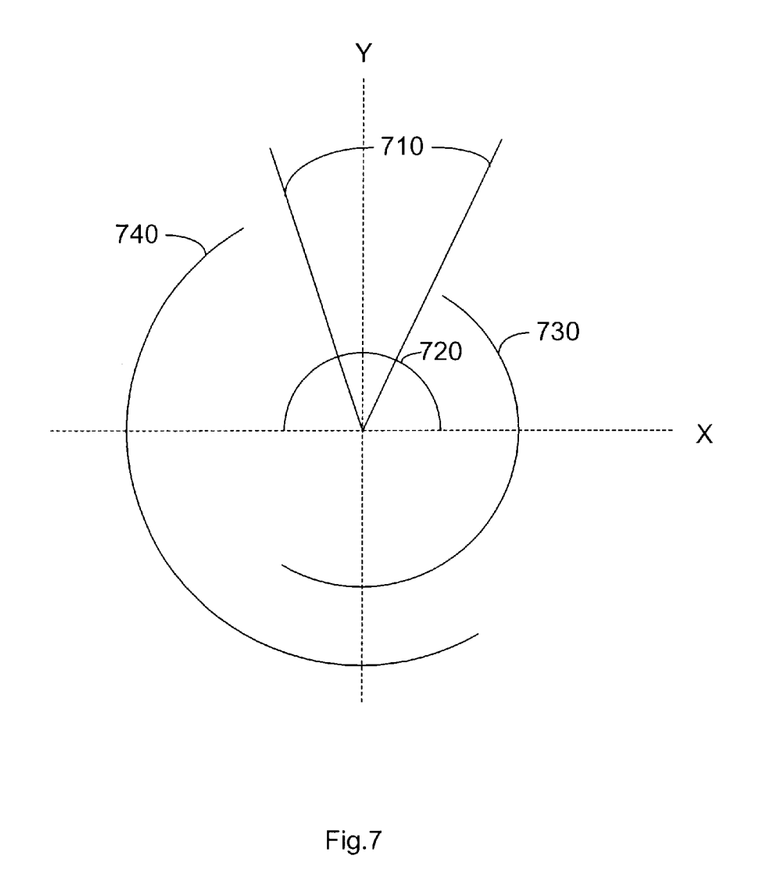
FIG. 7 is a representation of the field of views of multiple video streams in accordance with one embodiment of the present invention.

FIG. 7 illustrates using three video streams to produce an immersive video. Specifically, FIG. 7(a) includes a view window 710 and video streams 720, 730, and 740. View window 710 has a view angle of 50 degrees. Thus video streams 720, 730, and 740 must have a viewing angle of at least 170 degrees (i.e. 360/3+50 degrees). In FIG. 7, video streams 720, 730, and 740 include a buffer angle of 10 degrees. Thus video streams 720, 730, and 740 have a viewing angle of 180 degrees. Specifically, video stream 720 provides a view from 0 degrees to 180 degrees. Video stream 730 provides a view from negative 120 degrees (i.e. 240 degrees) to 60 degrees. Video stream 740 provides a view from 120 degrees to 300 degrees.

As stated above, many methods can be used to determine when to switch the active video stream. For example, in some embodiments of the present invention the active video stream can be determined directly from a horizontal angle of the view window. The horizontal angle of the view window is measured between the positive X axis and a projection from the center of the view window to the XY plane in the counter clockwise direction. Each video stream is assigned to a specific range of the horizontal angle of the view window. If the horizontal angle of the view window is in a specific range, the video stream assigned to that specific range is the active video stream. For example in FIG. 5, video streams 510, 520, 530 and 540 are assigned to angular ranges negative 45 degrees to 45 degrees, 225 degrees to 315 degrees, 135 degrees to 315 degrees, and 45 degrees to 135 degrees, respectively.

However, in some embodiments of the present invention, the viewing angle of the video stream are not fixed and some embodiments of the present invention do not use video streams having the same viewing angle. Thus, an adaptive method of switching the active video stream is used in some embodiments of the present invention. In accordance with one embodiment of the present invention, the active video stream switches to a right adjacent video stream when the right edge of the view window is closer to a right edge of the active video stream than the left edge of the video window is close to a left edge of the right adjacent video stream. Conversely, the active video stream switches to a left adjacent video stream when the left edge of the view window is closer to a left edge of the active video stream than the right edge of the video window is close to a right edge of the left adjacent video stream. As used herein left and right are defined from the point of view of viewer 105 facing the center of a view window or a video stream. Thus, if video stream 540 is the active video stream, then video stream 510 is the right adjacent video stream and video stream 530 is the left adjacent video stream.

For convenience, a right active distance measure is defined as a relative measure of the distance between the right edge of the view window and the right edge of the active video stream. Similarly, a left active distance measure is defined as a relative measure of the distance between the left edge of the view window and the left edge of the active video stream. In addition, a right adjacent difference measure is defined as a relative measure of the distance between the left edge of the right adjacent video stream and the left edge of the view window. Similarly, a left adjacent difference measure is defined as a relative measure of the distance between the right edge of the left adjacent video stream and the right edge of the view window. Relative measure allows for the use of proxy measures with the same relative relationship between the right active distance measure, the left active distance measure, the right adjacent difference measure, and the left adjacent difference measure. For example, angular measurements may be used in place of actual distance measurements.

Thus, if the right adjacent distance measure is greater than the right active distance measure and the right adjacent video stream encompasses all of the view window, then the right adjacent video stream becomes the active video stream. Conversely if the left adjacent distance measure is greater than the left active distance measure and the left adjacent video stream encompasses all of the view window, then the left adjacent video stream becomes the active video stream. To prevent jitter, i.e. rapidly switching between to video streams, some embodiments of the present invention switches the active video stream when the right adjacent distance measure is greater than the right active distance measure by a jitter reduction value. Similarly, these embodiments also switch the active video stream when the left adjacent distance measure is greater than the left active distance measure by a jitter reduction value.

Figure 8A:
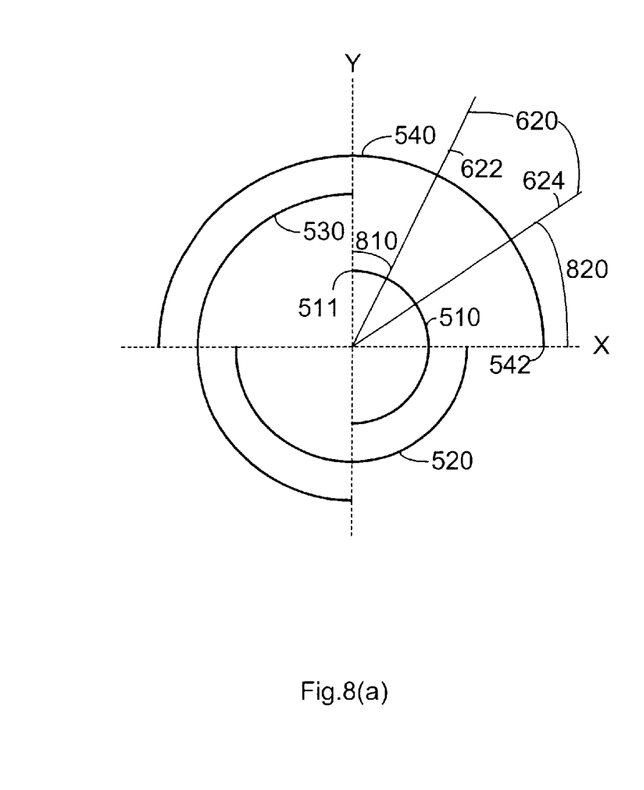
FIGS. 8(a)–8(b) illustrates the switching the active video stream to an adjacent video stream in accordance with an embodiment of the present invention.

FIG. 8(a) illustrates the switching of the active video stream from video stream 540 to video stream 510( i.e. the right adjacent video stream). Specifically, a right adjacent distance measure represented by angle 810, which is measured from a left edge 622 of view window 620 to a left edge 511 of video source 510 (i.e. the right adjacent video stream), is compared with a right active distance measure represented by angle 820, which is measured from a right edge 624 of view window 620 to a right edge 542 of video stream 540 (i.e. the active video stream). Angle 820 is a proxy measure for the distance between right edge 624 of view window 620 and right edge 542 of video stream 540. Similarly, angle 810 is a proxy measure for the distance between left edge 622 of view window 620 and left edge 511 of video stream 510. Thus, if angle 810 (i.e. the right adjacent distance measure) is greater than angle 820 (i.e. the right active distance measure) then the active video stream switches from video stream 540 to video stream 510.

Figure 8B:
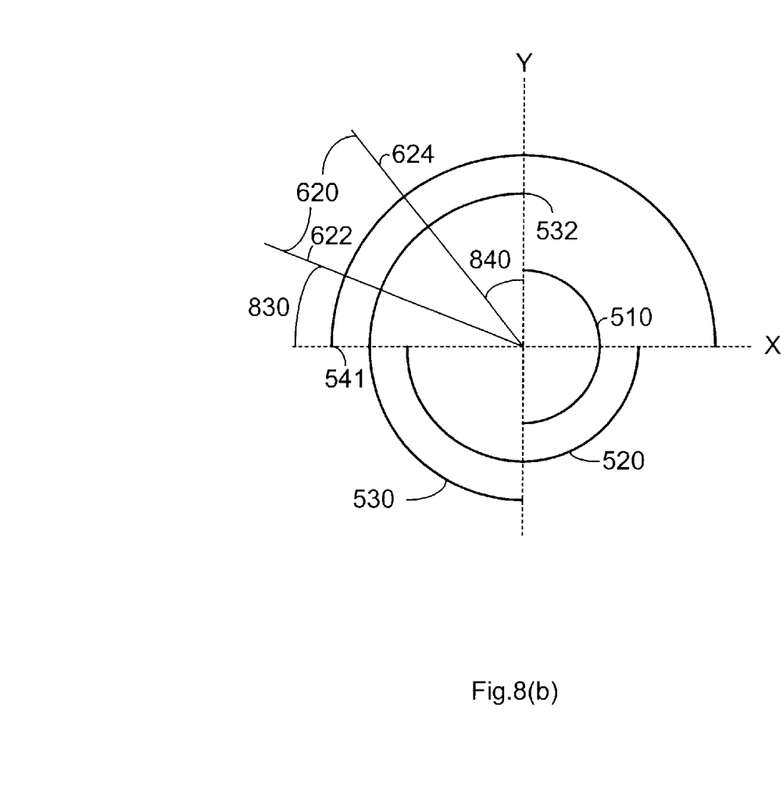

FIG. 8(b) illustrates the switching of the active video stream from video stream 540 to video stream 530( i.e. the left adjacent video stream). Specifically, a left adjacent distance measure represented by angle 840, which is measured from right edge 624 of view window 620 to a right edge 532 of video source 530 (i.e. the left adjacent video stream), is compared with a left active distance measure represented by angle 830, which is measured from left edge 622 of view window 620 to a left edge 541 of video stream 540 (i.e. the active video stream). If angle 840 (i.e. the left adjacent distance measure) is greater than angle 830 (i.e. the left active distance measure) then the active video stream switches from video stream 540 to video stream 530. Other embodiments of the present invention may use other procedures to determine when the active video stream switches.

Figure 9:
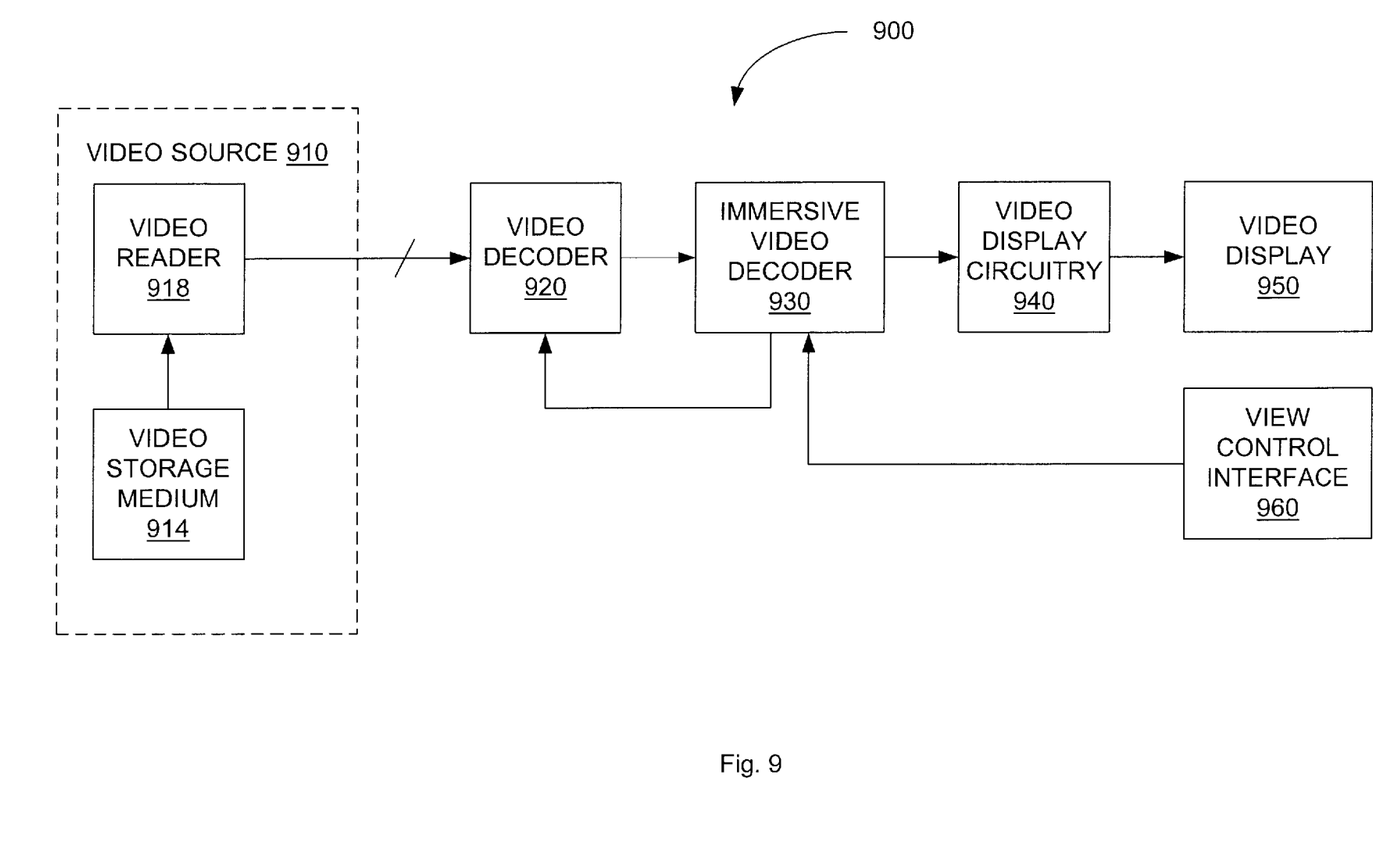
FIG. 9 is a block diagram of an immersive video system in accordance with one embodiment of the present invention.

FIG. 9 is a block diagram of an immersive video system 900 in accordance with one embodiment of the present invention. Video system 900 includes a video source 910, a video decoder 920, an immersive video decoder 930, video display circuitry 940, video display 950, and a view control interface 960. Video source 910 provides multiple video streams to video decoder 920. Video source 910 can be of conventional design. For example in some embodiments of the present invention, video source 910 includes a video storage medium 914 and a video reader 918. Video storage medium 914 stores multiple video streams for the immersive video as described above. Video reader 918 reads the multiple video streams off of video storage medium 914 and provides the multiple video streams to video decoder 920. In a specific embodiment of the present invention, video source 910 uses conventional Digital Versatile Disk (DVD) technology. Specifically, video storage medium 914 is a DVD, on which the multiple video streams are stored as DVD multi-angle format streams. In this embodiment, video reader 918 is a conventional DVD video reader. Other embodiments may use solid state memories, such as DRAMs, SRAMs, or Flash RAM for video storage medium 914; magnetic memories such as disk drives or tape drives; or optical memory systems.

Video decoder 920 receives the multiple video stream from Video source 910 and decodes the active video stream as directed by immersive video decoder 930. Video decoder 920 can also be of conventional design, such as conventional DVD vide decoders.

Immersive video decoder 930 selects the active video stream as described above. Furthermore, immersive video decoder 930 performs the environment mapping functions as explained above to generate the image of a view window using conventional techniques. The placement of the view window within the environment is controlled by view control interface 960 which provides the user interface to immersive video system 900. The view window is generated using a conventional video format and is provided to video display circuitry 940. Immersive video decoder 930 may be implemented has a custom chip, ASIC, FPGA, or using software and a general purpose processor.

Video display circuitry 940 receives the view window from immersive video decoder 930 and drives a video signal to video display 950. As explained above, the video window is generated using a conventional video format. Therefore, video display circuitry 940 can be of conventional design. Video display circuitry 940 drives a video signal to video display 950, which can be for example a television or a computer monitor. A user of immersive video system 900 can watch the video window in video display 950 and control the placement of the video window using view control interface 960.

Figure 10A:
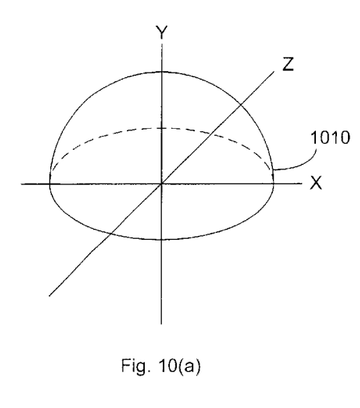
FIGS. 10(a)–10(f) are representations of the field of views of multiple video streams in accordance with an embodiment of the present invention.
Figure 10B:
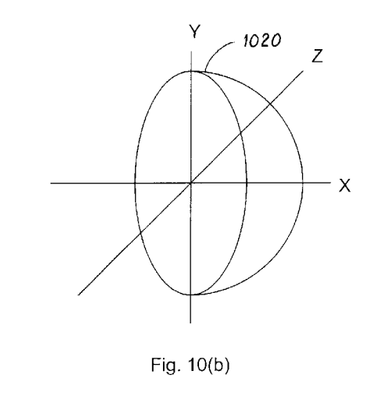
Figure 10C:
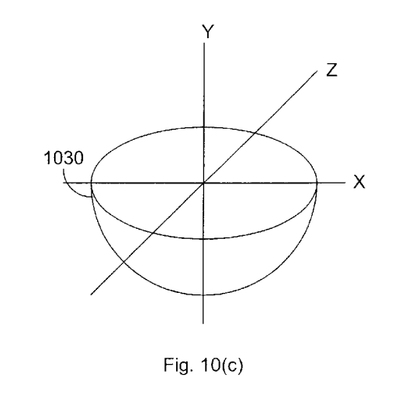
Figure 10D:
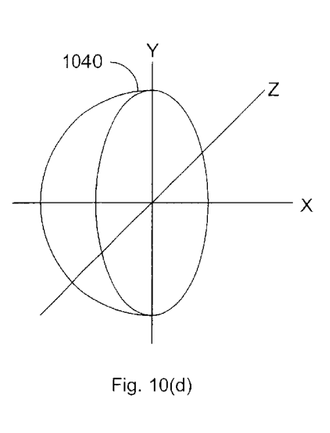
Figure 10E:
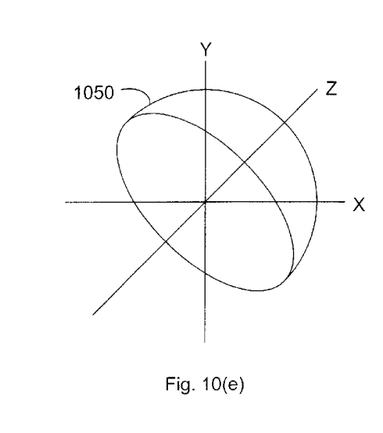
Figure 10F:
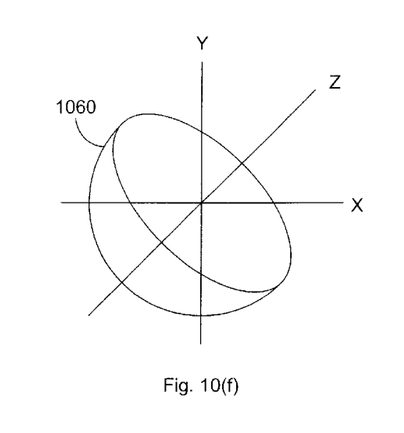

The principles of the present invention is applicable to immersive video streams providing a complete spherical environment. FIGS. 10(a)–10(f) illustrates using six video streams in an immersive video system, which can be used to provide high resolution immersive videos. Specifically, each of FIGS. 10(a)–10(f) shows the hemispherical view area of one video stream. FIG. 10(a) shows video stream 1010, which includes the environment information above the XZ plane in the positive Y direction. FIG. 10(b) shows video stream 1020, which includes the environment information above the YZ plane in the positive X direction. FIG. 10(c) shows video stream 1030, which includes the environment information below the XZ plane in the negative Y direction. FIG. 10(d) shows video stream 1040, which includes the environment information below the YZ plane in the negative X direction. FIG. 10(e) shows video stream 1050, which includes all the environment information above the XY plane in the positive Z direction. FIG. 10(f) shows video stream 1060, which includes all the environment information below the XY plane in the negative Z direction.

For spherical topologies, determining the active video stream must take into account both the horizontal orientation of the view window and the vertical orientation of the view window. In accordance with one embodiment of the present invention, vertical orientation of the view window is used to determine whether video stream 1050 or video stream 1060 should be the active view window. If neither video stream 1050 nor video stream 1060 should be the active video stream then the horizontal orientation of view window is used to determine which of video streams 1010, 1020, 1030, or 1040 should be the active video stream using the method described above for video streams 510, 520, 530, and 540.

Specifically, a vertical angle of the view window, as measured from the XY plane to the center of the view window is determined. As used herein, the vertical angle is positive if the center of the view window is above the XY plane in the direction of the positive Z axis. Conversely, the vertical angle of the view window is negative if the center of the view window is below the XY plane in the direction of the negative Z axis. If the vertical angle is greater than a top threshold angle then video stream 1050 becomes the active video stream. Conversely, if the vertical angle is less than a bottom threshold angle (which is a negative value) then video stream 1060 becomes the active video stream. If the vertical angle is between the top threshold angle and the bottom threshold angle, then one of video streams 1010, 1020, 1030, or 1040 is selected as the active video stream using one of the methods described above. For the embodiment of FIGS. 10(*a*)–10(*f*), the top threshold angle is 45 degrees and the bottom threshold angle is negative 45 degrees. For other embodiments the top threshold angle and bottom threshold angle depends on the height of the view window, the number of video streams, and the vertical viewing angle of the video streams.

In some embodiments of the present invention, video streams are switched when the view window is fully encompasses by a new video stream. For example, if video stream 1010 is the active video stream and the view window moves towards video stream 1020, video stream 1020 would become the active video stream when video stream 1020 encompasses all of the video window. For polygonal view windows, determining whether a video stream encompasses the entire view window can be determined by determining whether the vertices of the view window are encompassed by the video stream. Specifically, if all the vertices of a polygonal view window are encompassed by a video stream, the entire polygonal view window is encompassed in the view window.

In the above-described manner, high resolution immersive videos can be produced using multiple video streams. Specifically, an immersive video system in accordance with one embodiment of the present invention uses video stream conforming to conventional video standards so that conventional video equipment can be used to reduce the cost of the immersive video system. Thus, an immersive video system in accordance with the present invention can provide higher resolution immersive videos at lower cost than other immersive video systems. The various embodiments of the structures and methods of this invention that are described above are illustrative only of the principles of this invention and are not intended to limit the scope of the invention to the particular embodiments described. For example, in view of this disclosure, those skilled in the-art can define other view windows, video streams, viewing angles, top threshold angles, bottom threshold angles, texture projections, immersive video decoders, video storage mediums, and so forth, and use these alternative features to create a method or system according to the principles of this invention. Thus, the invention is limited only by the following claims.

What is claimed is:

1. An immersive video system for displaying a view window of an environment, the immersive video system comprising:

a video source configured to produce a plurality of video streams;

a video decoder coupled to the video source and configured to decode an active video stream; and an immersive video decoder coupled to the video decoder and configured to select the active video stream from the plurality of video streams;

wherein each of the plurality of video streams includes environment data for recreating a viewable range of the environment, the environment data for each video stream including first data that overlaps at least one other video stream and second data that does not overlap the at least one other video stream.

2. The immersive video system of claim 1, wherein the environment encompasses 360 degrees of viewing angle.

3. The immersive video system of claim 1, wherein each of the video streams overlaps at least one other video stream by a viewing angle of the view window.

4. The immersive video system of claim 1, wherein each of the video streams overlaps at least two other video streams by a viewing angle of the view window.

5. The immersive video system of claim 1, wherein the immersive video decoder is configured to generate an image for the view window.

6. The immersive video system of claim 1, wherein the immersive video decoder selects the active video stream based on a position of the view window.

7. The immersive video system of claim 1, further comprising a view control interface coupled to the immersive video decoder.

8. The immersive video system of claim 7, wherein the view control interface is configured to position the view window.

9. The immersive video system of claim 1, wherein the video source comprises:

a video reader; and a video storage medium.

10. The immersive video system of claim 9, wherein the video storage medium is a DVD.

11. The immersive video system of claim 9, wherein the video storage medium is a hard disk.

12. The immersive video system of claim 9, wherein the video storage medium comprises solid state memories.

13. The immersive video system of claim 1, wherein the environment is based on a cylindrical projection.

14. The immersive video system of claim 1, wherein the environment is based on a spherical projection.

15. The immersive video system of claim 1, wherein the each of the video streams provides a hemispherical view of the environment.

16. A video storage medium encoded with:

a first video stream including environment data for recreating a first viewable range on an environment from a point of reference;

a second video stream including environment data for recreating a second viewable range on the environment from the point of reference, wherein the second viewable range is different from the first viewable range; and a third video stream including environment data for recreating a third viewable range on the environment from the point of reference, wherein the third viewable range is different from the first viewable range and the second viewable range, wherein the first viewable range overlaps the second viewable range and the third viewable range.

17. The video storage medium of claim 16, wherein the second viewable range overlaps the third viewable range.

18. The video storage medium of claim 16, further encoded with a fourth video stream including environment data for recreating a fourth viewable range on the environment from the point of reference, wherein the fourth viewable range is different from the first viewable range, the second viewable range, and the third viewable range.

19. The video storage medium of claim 18, wherein the second viewable range overlaps the third viewable range and the third viewable range overlaps the fourth viewable range.

20. The video storage medium of claim 19, wherein the fourth viewable range overlaps the first viewable range.

21. The video storage medium of claim 16, wherein the environment is based on a cylindrical projection.

22. The video storage medium of claim 16, wherein the environment is based on a spherical projection.

23. The video storage medium of claim 10, wherein the video storage medium is a DVD.

24. A method of displaying a view window of an environment from a plurality of video streams, wherein each video stream includes environment data for recreating different viewable ranges of the environment, the method comprising:

selecting an active video stream from the plurality of video streams;
   decoding the active video stream; and
   generating an image for the view window using the active video stream.

25. The method of claim 24, further comprising assigning an angular range to a subset of the video streams.

26. The method of claim 25, wherein the subset contains all the video streams.

27. The method of claim 25, wherein the selecting an active video stream from the plurality of video streams, comprises:

determining a horizontal angle of the view window; and
   selecting the video stream assigned to the angular range containing the horizontal angle.

28. The method of 25, further comprising assigning a top threshold angle to a top video stream and a bottom threshold angle to a bottom video stream.

29. The method of claim 28, wherein the selecting an active video stream from the plurality of video streams, comprises:

determining a vertical angle of the view window; and
   determining a horizontal angle of the view window.

30. The method of claim 29, wherein the selecting an active video stream from the plurality of video streams, further comprises:

selecting the top video stream when the vertical angle of the view window is greater than or equal to the top threshold angle;
   selecting the bottom video stream when the vertical angle of the view window is less than or equal to the bottom threshold angle; and
   selecting the video stream assigned to the angular range containing the horizontal angle of the view window when the vertical angle of the view window is less than the top threshold angle and greater than the bottom threshold angle.

31. The method of claim 24, wherein the selecting an active video stream from the plurality of video streams, comprises:

determining when the view window is contained within a non-active video stream; and
   and selecting the non-active video stream containing the view window as the active video stream.

32. The method of claim 31, wherein the determining when the view window is contained within a non-active video stream, comprises determining when the vertices of the view window is contained within a non-active video stream.

* * * * *